United States Patent
Kobayashi et al.

(10) Patent No.: US 8,501,327 B2
(45) Date of Patent: *Aug. 6, 2013

(54) ALUMINUM ALLOY CLAD SHEET FOR HEAT EXCHANGER

(75) Inventors: Nobuhiro Kobayashi, Kobe (JP); Shinji Sakashita, Kobe (JP); Toshiki Ueda, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,499

(22) Filed: May 24, 2012

(65) Prior Publication Data
US 2012/0231293 A1      Sep. 13, 2012

Related U.S. Application Data

(63) Continuation of application No. 12/689,583, filed on Jan. 19, 2010.

(30) Foreign Application Priority Data

Jan. 22, 2009   (JP) ................. 2009-012044

(51) Int. Cl.
B32B 15/20 (2006.01)
C22C 21/00 (2006.01)
(52) U.S. Cl.
USPC ........................................ 428/654; 428/933
(58) Field of Classification Search
None
See application file for complete search history.

(56) References Cited

U.S. PATENT DOCUMENTS

| | | | |
|---|---|---|---|
| 5,744,255 | A | 4/1998 | Doko et al. |
| 6,465,113 | B2 | 10/2002 | Yamada et al. |
| 2007/0166565 | A1 | 7/2007 | Fukumoto et al. |
| 2007/0246509 | A1 | 10/2007 | Koshigoe et al. |
| 2009/0020585 | A1 | 1/2009 | Fukumoto et al. |
| 2009/0078398 | A1 | 3/2009 | Ueda et al. |
| 2009/0165901 | A1 | 7/2009 | Koshigoe et al. |
| 2010/0101688 | A1 | 4/2010 | Koshigoe et al. |
| 2010/0112370 | A1 | 5/2010 | Ueda et al. |

(Continued)

FOREIGN PATENT DOCUMENTS

| | | |
|---|---|---|
| EP | 1090745 | 4/2001 |
| JP | 57-62858 | 4/1982 |

(Continued)

OTHER PUBLICATIONS

Chinese Office Action issued on Jun. 9, 2011 in corresponding Chinese Application No. 201010108608.8 (with an English Translation).

(Continued)

*Primary Examiner* — John J Zimmerman
(74) *Attorney, Agent, or Firm* — Oblon, Spivak, McClelland, Maier & Neustadt, L.L.P.

(57) ABSTRACT

An aluminum alloy clad sheet for heat exchangers includes a core layer, a sacrificial layer disposed on one side of the core layer, and a brazing layer of an Al—Si alloy disposed on the other side of the core layer, wherein the core layer contains Si: 0.15% to 1.6% by mass, Mn: 0.3% to 2.0% by mass, Cu: 0.1% to 1.0% by mass, Ti: 0.02% to 0.30% by mass, and the remainder of Al and incidental impurities, and the sacrificial layer contains Zn: 4.0% to 10.0% by mass, Cr: 0.01% to 0.5% by mass, and the remainder of Al and incidental impurities.

20 Claims, 2 Drawing Sheets

U.S. PATENT DOCUMENTS

| | | | |
|---|---|---|---|
| 2010/0183897 A1* | 7/2010 | Kobayashi et al. | 428/654 |
| 2011/0014494 A1 | 1/2011 | Matsumoto et al. | |
| 2011/0027610 A1 | 2/2011 | Tatsumi et al. | |

FOREIGN PATENT DOCUMENTS

| | | |
|---|---|---|
| JP | 11-61306 | 3/1999 |
| JP | 2000-87162 | 3/2000 |
| JP | 2001-340989 | 12/2001 |
| JP | 2004-35966 | 2/2004 |
| JP | 2004-76057 | 3/2004 |
| JP | 2005-232506 | 9/2005 |
| JP | 2005-314719 | 11/2005 |
| WO | WO 2008/078598 A1 | 7/2008 |

OTHER PUBLICATIONS

U.S. Office Action mailed Jun. 18, 2012 in co-pending U.S. Appl. No. 12/689,583.

Graeme Marshall, et al., "Aluminum Alloys: Processing", Material Science on CD-ROM version 2.1, Alcan International Ltd., Oct. 1997 (Copyright 2000—University of Liverpool).

U.S. Office Action mailed Nov. 25, 2011 in co-pending U.S. Appl. No. 12/689,583.

Office Action issued Mar. 14, 2013, in Japanese Patent Application No. 2009-012044, filed Jan. 22, 2009 (w/English-language Translation).

* cited by examiner

ALUMINUM ALLOY CLAD SHEET FOR HEAT EXCHANGER

CROSS REFERENCE TO RELATED APPLICATIONS

The present application is a continuing application based on U.S. Ser. No. 12/689,583, filed Jan. 19, 2010, which claims the benefit of the filing date of Japanese Application No. 2009-012044, filed on Jan. 22, 2009, the text of each of which is incorporated by reference.

BACKGROUND OF THE INVENTION

1. Field of the Invention

The present invention relates to an aluminum alloy clad sheet for heat exchangers, for example, for use in automobiles.

2. Description of the Related Art

In general, various aluminum alloy clad sheets that include a brazing layer and a sacrificial layer (an anticorrosive sacrificial layer for a core layer) on one or both sides of a core layer have been used for automotive heat exchangers. Such an aluminum alloy clad sheet for heat exchangers is currently required to have high strength, high corrosion resistance, and a small thickness, for example, 0.3 mm or less to reduce the vehicle weight.

For example, Japanese Unexamined Patent Application Publication No. 11-61306 discloses an aluminum alloy composite sheet for heat exchangers in which, while the Zn and Mn contents in a sacrificial layer (sacrificial anode layer) are specified, the size and distribution of an Al—Mn intermetallic compound in the sacrificial layer are controlled to reduce the corrosion current associated with the anticorrosive effects of the sacrificial layer, thereby increasing the corrosion resistance of the aluminum alloy composite sheet.

More specifically, each side of an aluminum alloy core layer of the aluminum alloy composite sheet is clad with an aluminum alloy sacrificial layer and an Al—Si alloy brazing layer to reduce the corrosion current associated with the anticorrosive effects of the sacrificial layer to 40 $\mu A/cm^2$ or less. The aluminum alloy of the sacrificial layer contains 1.0% to 6.0% by mass Zn, 0.2% to 2.0% by mass Mn, and the remainder of Al and incidental impurities and contains an Al—Mn intermetallic compound having an average particle size in the range of 0.1 to 0.8 $\mu m$ at a number density of $2.0 \times 10^9/mm^3$ or more. The Al—Si alloy brazing layer contains a predetermined amount of Si.

Japanese Unexamined Patent Application Publication No. 2004-76057 discloses an aluminum alloy clad sheet for heat exchangers in which, while the Mn, Cu, Si, and Fe contents in a core layer and the Zn, Mn, Si, and Fe contents in a sacrificial layer (sacrificial anode layer) are specified, the size and density of a compound in the sacrificial layer are adjusted to control electric potential gradient and corrosion morphology, thereby increasing the corrosion resistance of the aluminum alloy clad sheet.

More specifically, one side of the core layer of the aluminum alloy clad sheet for heat exchangers is clad with an Al—Si brazing layer, and the other side of the core layer is clad with a sacrificial layer. The core layer contains Mn: 0.6% to 2.0% by mass, Cu: 0.3% to 1.0% by mass, Si: 0.3% to 1.2% by mass, Fe: 0.01% to 0.4% by mass, and the remainder of Al and impurities. The sacrificial layer contains Zn: 2.0% to 6.0% by mass, Mn: 0.2% to 1.0% by mass, Si: 0.01% to 0.4% by mass, Fe: 0.01% to 0.3% by mass, and the remainder of Al and impurities. The number of compound particles having a size of 0.1 $\mu m$ or more in a Mn compound, a Si compound, and a Fe compound in the matrix of the sacrificial layer is $2 \times 10^6/mm^2$ or less.

However, existing aluminum alloy clad sheets for heat exchangers have the following problems.

Although the thickness of a sheet for automotive heat exchangers has been reduced, a further reduction in thickness is increasingly required for further reductions in weight, size, and costs. A reduction in the thickness of an aluminum alloy clad sheet for heat exchangers requires high corrosion resistance. Aluminum alloy clad sheets for heat exchangers also require excellent brazeability.

Although corrosion resistance and brazeability have been improved by conventional techniques, there is a demand for development of aluminum alloy clad sheets for heat exchangers having higher corrosion resistance and excellent brazeability to reduce the thickness of the sheets.

In general, to increase the strength of aluminum alloy clad sheets, alloying elements, such as Mn, Fe, Si, and Cu, are added to aluminum alloys. In such aluminum alloy clad sheets, for example, it is difficult to achieve sufficient corrosion resistance only by controlling the Al—Mn intermetallic compound as described in Japanese Unexamined Patent Application Publication No. 11-61306. In particular, under conditions of use where pore corrosion (hereinafter referred to as "pitting corrosion"; resistance to pitting corrosion is referred to as "pitting corrosion resistance") proceeds, for example, when aluminum alloy clad sheets are used in automotive radiator tubes, pitting (a hole from the inner surface to the outer surface of a tube) may occur within a relatively short time.

Alloying elements, such as Mn, Fe, Si, and Cu, added to aluminum alloy clad sheets form intermetallic compounds, for example, Al—Mn, such as $MnAl_6$, $Al_{12}SiMn_3$, and $Al_{12}Si(Mn, Fe)_3$, Al—Cu, such as $Al_2Cu$, and other intermetallic compounds, such as $Al_3Fe$ and $Al_{12}Fe_3Si$, in the aluminum alloy. After brazing heating at 595° C. for 3 minutes, an alloying element, such as Cu, contained in an aluminum alloy of a core layer may diffuse from the core layer and dissolve in the matrix of an aluminum alloy of a sacrificial layer as solid solution or form an intermetallic compound, as described above. The formation of an intermetallic compound is an inevitable phenomenon, for example, in the addition of an alloying element or hot rolling.

Among these intermetallic compounds, Al—Mn, Al—Mn—Si, and Al—Cu intermetallic compounds are the origins of corrosion. More specifically, Al—Mn, Al—Mn—Si, and Al—Cu intermetallic compounds act as cathode sites in an aluminum alloy and accelerate local corrosion in the neighborhoods of the cathode sites, thus accelerating pitting corrosion. In particular, a small number of coarse intermetallic compound produce a small number of pitting corrosion sites originating from the particles, thus concentrating anodic dissolution on the pitting corrosion sites and accelerating pitting.

SUMMARY OF THE INVENTION

In view of the situations described above, it is an object of the present invention to provide an aluminum alloy clad sheet for heat exchangers that has excellent brazeability and high pitting corrosion resistance.

An aluminum alloy clad sheet for heat exchangers (hereinafter referred to simply as a "clad sheet", if appropriate) according to one aspect of the present invention includes a core layer, a sacrificial layer disposed on one side of the core layer, and a brazing layer of an Al—Si alloy disposed on the other side of the core layer, wherein the core layer contains Si: 0.15% to 1.6% by mass, Mn: 0.3% to 2.0% by mass, Cu: 0.1% to 1.0% by mass, Ti: 0.02% to 0.30% by mass, and the remainder of Al and incidental impurities, and the sacrificial layer contains Zn: 4.0% to 10.0% by mass, Cr: 0.01% to 0.5% by mass, and the remainder of Al and incidental impurities.

The specified amounts of Si, Mn, Cu, and Ti in the core layer improve the strength and the pitting corrosion resistance of the core layer. The specified amounts of Zn and Cr in the sacrificial layer improve the strength and the pitting corrosion resistance of the sacrificial layer.

An aluminum alloy clad sheet for heat exchangers according to another aspect of the present invention includes a core layer, a sacrificial layer disposed on one side of the core layer, and a brazing layer of an Al—Si alloy disposed on the other side of the core layer, wherein the core layer contains Si: 0.15% to 1.6% by mass, Mn: 0.3% to 2.0% by mass, Cu: 0.1% to 1.0% by mass, Ti: 0.02% to 0.30% by mass, and the remainder of Al and incidental impurities, the sacrificial layer contains Zn: 4.0% to 10.0% by mass, Cr: 0.01% to 0.5% by mass, Si: 1.0% by mass or less (excluding 0% by mass), Mn: 2.0% by mass or less (excluding 0% by mass), and the remainder of Al and incidental impurities, the maximum size of Al—Mn, Al—Mn—Si, and Al—Cu intermetallic compounds precipitated in the sacrificial layer after brazing heating at 595° C. for 3 minutes in an electron micrograph of a cross section of the sacrificial layer vertical to the rolling direction of the sacrificial layer (hereinafter referred to simply as a "cross section of a sacrificial layer", if appropriate) ranges from 10 nm to 1 μm in terms of equivalent circular diameter, the number density of Al—Mn, Al—Mn—Si, and Al—Cu intermetallic compounds having an equivalent circular diameter in the range of 10 nm to 1 μm is $1 \times 10^5/\text{mm}^2$ or more, and the area percentage of Al—Mn, Al—Mn—Si, and Al—Cu intermetallic compounds having an equivalent circular diameter in the range of 10 nm to 1 μm is 4% or less.

The specified amounts of Si, Mn, Cu, and Ti in the core layer improve the strength and the pitting corrosion resistance of the core layer. The specified amounts of Zn, Cr, Si, and Mn in the sacrificial layer improve the strength and the pitting corrosion resistance of the sacrificial layer. Furthermore, the dispersion (the maximum size (in terms of equivalent circular diameter), the number density, and the area percentage) of an intermetallic compound precipitated in the sacrificial layer is controlled to reduce pitting corrosion originating from the intermetallic compound and prevent the concentration of anodic dissolution. This does not accelerate local corrosion in the neighborhood of the intermetallic compound and reduces the occurrence of pitting.

In an aluminum alloy clad sheet for heat exchangers according to the present invention, the core layer may further contain Mg: 0.05% to 0.7% by mass.

The specified amount of Mg in the core layer can form a $Mg_2Si$ compound to improve the strength of the core layer.

An aluminum alloy clad sheet for heat exchangers according to the present invention may further include an intermediate layer formed of a Mg-free aluminum alloy between the core layer and the brazing layer.

The intermediate layer between the core layer and the brazing layer can prevent the thermal diffusion of Mg contained in the core layer into the brazing layer and thereby prevent deterioration in brazeability.

In an aluminum alloy clad sheet for heat exchangers according to the present invention, the specified amounts of the specified elements in the core layer and the sacrificial layer can improve the strength and the pitting corrosion resistance of the clad sheet without causing deterioration in brazeability. Furthermore, in an aluminum alloy clad sheet for heat exchangers according to the present invention, the specified amounts of the specified elements in the core layer and the sacrificial layer and control of the dispersion of an intermetallic compound precipitated in the sacrificial layer after brazing heating at 595° C. for 3 minutes can improve the strength and the pitting corrosion resistance of the clad sheet without causing deterioration in brazeability. The specified amount of Mg in the core layer can further improve the strength of the clad sheet. The intermediate layer between the core layer and the brazing layer can prevent deterioration in brazeability.

DESCRIPTION OF THE PREFERRED EMBODIMENTS

An aluminum alloy clad sheet for heat exchangers according to the present invention will be described in detail below with reference to the drawings.

Figure 1A:
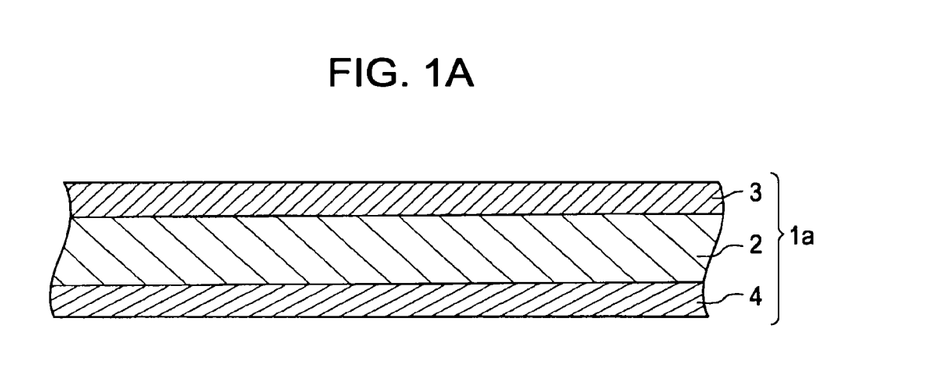
FIGS. 1A and 1B are cross-sectional views of an aluminum alloy clad sheet for heat exchangers according to an embodiment of the present invention.

As illustrated in FIG. 1A, an aluminum alloy clad sheet for heat exchangers according to one embodiment of the present invention is a three-layer aluminum alloy clad sheet for heat exchangers 1a (clad sheet 1a) that includes a sacrificial layer 3 on one side of a core layer 2 and a brazing layer 4 on the other side of the core layer 2.

Figure 1B:
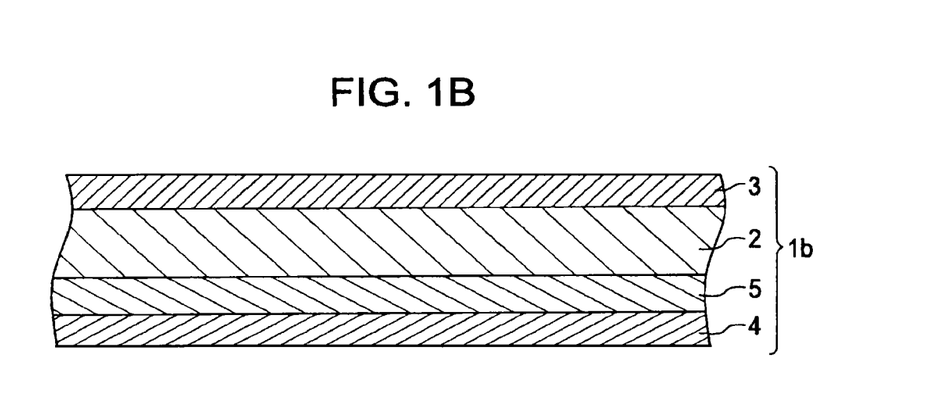

On the condition that an aluminum alloy clad sheet for heat exchangers includes a sacrificial layer on the outermost surface on one side of a core layer and a brazing layer on the outermost surface on the other side of the core layer, an aluminum alloy clad sheet for heat exchangers may be a four-layer aluminum alloy clad sheet for heat exchangers 1b (clad sheet 1b) that includes a sacrificial layer 3 on one side of a core layer 2 and an intermediate layer 5 and a brazing layer 4 on the other side of the core layer 2, as illustrated in FIG. 1B.

An aluminum alloy clad sheet for heat exchangers may be a five-or-more-layer clad sheet in which the numbers of sacrificial layers 3, brazing layers 4, and/or intermediate layers 5 are increased (not shown).

The following are reasons that the amounts of alloy components in the core layer 2, the sacrificial layer 3, the brazing layer 4, and the intermediate layer 5 of the clad sheets 1a and 1b were determined as described above. The dispersion of an intermetallic compound precipitated in the sacrificial layer 3 will also be described.

First Embodiment

In an aluminum alloy clad sheet for heat exchangers according to a first embodiment of the present invention, a core layer 2 contains predetermined amounts of Si, Mn, Cu, Ti, and optional Mg, and the remainder of Al and incidental impurities, and a sacrificial layer 3 contains predetermined amounts of Zn and Cr, and the remainder of Al and incidental impurities.

Core Layer

The core layer 2 contains Si: 0.15% to 1.6% by mass, Mn: 0.3% to 2.0% by mass, Cu: 0.1% to 1.0% by mass, Ti: 0.02% to 0.30% by mass, and the remainder of Al and incidental impurities. The core layer 2 may further contain Mg: 0.05% to 0.7% by mass to improve the strength of the core layer 2.

Si: 0.15% to 1.6% by Mass

Si is effective in improving the strength of the core layer 2. In particular, when the core layer 2 contains Mg, a Si—Mg precipitate can improve the strength of the core layer 2. However, less than 0.15% by mass Si is insufficient to improve the strength of the core layer 2. On the other hand, more than 1.6% by mass Si reduces the melting point of the core layer 2, causing fusion of the core layer 2 during brazing.

Hence, the Si content ranges from 0.15% to 1.6% by mass, preferably 0.5% to 1.2% by mass.

Mn: 0.3% to 2.0% by Mass

Mn is effective in improving the strength and the pitting corrosion resistance of the core layer 2. However, less than 0.3% by mass Mn is insufficient to improve the strength of the core layer 2. On the other hand, more than 2.0% by mass Mn may result in the formation of a coarse precipitate, lowering the processibility of the core layer 2. In addition, if pitting corrosion reaches the core layer 2, the coarse precipitate acts as a cathode site, lowering the pitting corrosion resistance of the core layer 2.

Hence, the Mn content ranges from 0.3% to 2.0% by mass, preferably 0.6% to 1.7% by mass.

Cu: 0.1% to 1.0% by Mass

Cu is effective in improving the strength of the core layer 2. However, Cu in the core layer 2 increases susceptibility to intergranular corrosion, lowering pitting corrosion resistance on the side of the sacrificial layer 3. Adding Zn to the sacrificial layer 3 and lowering the electric potential of the sacrificial layer 3 relative to the core layer 2 and the grain boundary can prevent intergranular corrosion. However, less than 0.1% by mass Cu is insufficient to ensure the potential difference between the core layer 2 and the sacrificial layer 3, thus lowering the pitting corrosion resistance of the core layer 2. On the other hand, more than 1.0% by mass Cu reduces the melting point of the core layer 2, causing fusion of the core layer 2 during brazing.

Hence, the Cu content ranges from 0.1% to 1.0% by mass, preferably 0.6% to 1.0% by mass.

Ti: 0.02% to 0.30% by Mass

Ti is distributed in the form of a layer in the core layer 2 and stratifies corrosion morphology, thus improving the pitting corrosion resistance of the core layer 2. However, less than 0.02% by mass Ti is insufficient to stratify corrosion morphology. On the other hand, more than 0.30% by mass Ti may result in the production of coarse Al—Ti intermetallic compound, causing cracks in shape processing.

Hence, the Ti content ranges from 0.02% to 0.30% by mass.

Mg: 0.05% to 0.7% by Mass

Mg is effective in improving the strength of the core layer 2. In particular, Mg can form a $Mg_2Si$ compound and improve the strength of the core layer 2. However, less than 0.05% by mass Mg is insufficient to improve the strength of the core layer 2 and is ineffective. On the other hand, in a general brazing method using flux (a Nocolok method), more than 0.7% by mass Mg may react with a flux component, lowering the brazeability. Hence, the Mg content ranges from 0.05% to 0.7% by mass, preferably 0.1% to 0.5% by mass.

Remainder: Al and Incidental Impurities

In addition to the components described above, the core layer 2 contains the remainder of Al and incidental impurities. Examples of the incidental impurities include Zr, B, and Fe. Such incidental impurities, for example, 0.2% by mass or less Zr, 0.1% by mass or less B, and 0.2% by mass or less Fe (each excluding 0% by mass) do not compromise the advantages of the present invention. Thus, the core layer 2 may contain such incidental impurities. More specifically, the core layer 2 may contain up to 0.4% by mass incidental impurities in total.

Sacrificial Layer

The sacrificial layer 3 contains Zn: 4.0% to 10.0% by mass, Cr: 0.01% to 0.5% by mass, and the remainder of Al and incidental impurities.

Zn: 4.0% to 10.0% by Mass

Zn is effective in lowering the electric potential of the sacrificial layer 3. As described above, since Cu in the core layer 2 increases susceptibility to intergranular corrosion, the sacrificial layer 3 must have low electric potential. Less than 4.0% by mass Zn may result in an insufficient potential difference between the core layer 2 and the sacrificial layer 3, causing intergranular corrosion in the core layer 2 and low pitting corrosion resistance of the core layer 2. On the other hand, more than 10.0% by mass Zn may result in the cracking of the clad sheet during cladding and an increase in the self-corrosion rate of the sacrificial layer 3, which causes early corrosion of the sacrificial layer 3 and low pitting corrosion resistance of the sacrificial layer 3.

Hence, the Zn content ranges from 4.0% to 10.0% by mass, preferably 4.5% to 7.0% by mass.

Cr: 0.01% to 0.5% by Mass

Cr, together with Al, may form a precipitate in the sacrificial layer 3 and act as an origin from which a compound acting as a cathode site is precipitated. The addition of Cr therefore allows cathode sites to be finely dispersed, increasing the number of origins of pitting corrosion, and is effective in preventing corrosion from proceeding in the depth direction. Less than 0.01% by mass Cr may result in insufficient dispersion of cathode sites and cannot sufficiently improve the pitting corrosion resistance of the clad sheet. On the other hand, more than 0.5% by mass Cr may result in the formation of a coarse precipitate and insufficient dispersion of cathode sites, even lowering the pitting corrosion resistance of the clad sheet.

Hence, the Cr content ranges from 0.01% to 0.5% by mass, preferably 0.05% to 0.3% by mass.

Remainder: Al and Incidental Impurities

In addition to the components described above, the sacrificial layer 3 contains the remainder of Al and incidental impurities. Examples of the incidental impurities include Ti, Zr, B, and Fe. Such incidental impurities, for example, 0.05% by mass or less Ti, 0.2% by mass or less Zr, 0.1% by mass or less B, and 0.2% by mass or less Fe (each excluding 0% by mass) do not compromise the advantages of the present invention. Thus, the sacrificial layer 3 may contain such incidental impurities. More specifically, the sacrificial layer 3 may contain 0.4% by mass incidental impurities in total.

Second Embodiment

In an aluminum alloy clad sheet for heat exchangers according to a second embodiment of the present invention, a core layer 2 contains predetermined amounts of Si, Mn, Cu, Ti, and optional Mg, and the remainder of Al and incidental impurities, and a sacrificial layer 3 contains predetermined amounts of Zn, Cr, Si, and Mn, and the remainder of Al and incidental impurities. The dispersion of an intermetallic compound precipitated in the sacrificial layer 3 is controlled in a predetermined manner.

Core Layer

The core layer 2 contains Si: 0.15% to 1.6% by mass, Mn: 0.3% to 2.0% by mass, Cu: 0.1% to 1.0% by mass, Ti: 0.02% to 0.30% by mass, and the remainder of Al and incidental impurities. The core layer 2 may further contain Mg: 0.05% to 0.7% by mass to improve the strength of the core layer 2. The reason that the amounts of alloy components in the core layer 2 have been specified and the description of the remainder are the same as in the first embodiment and will not be further described.

Sacrificial Layer

The sacrificial layer 3 contains Zn: 4.0% to 10.0% by mass, Cr: 0.01% to 0.5% by mass, Si: 1.0% by mass or less (excluding 0% by mass), Mn: 2.0% by mass or less (excluding 0% by mass), and the remainder of Al and incidental impurities. The reason that the Zn and Cr contents have been specified and the description of the remainder are the same as in the first embodiment and will not be further described.

Si: 1.0% by Mass or Less (Excluding 0% by Mass)

Si is effective in improving the strength of the sacrificial layer 3. Although the strength of the sacrificial layer 3 increases with the Si content, more than 1.0% by mass Si may result in the formation of a coarse precipitate and an increase in susceptibility to intergranular corrosion, thus lowering the pitting corrosion resistance of the sacrificial layer 3.

Hence, the Si content is 1.0% by mass or less, preferably 0.1% to 0.7% by mass.

Mn: 2.0% by Mass or Less (Excluding 0% by Mass)

Mn is effective in improving the strength of the sacrificial layer 3. Mn dissolves in the sacrificial layer 3 as solid solution and improves the strength of the sacrificial layer 3. Although the strength of the sacrificial layer 3 increases with the Mn content, more than 2.0% by mass Mn may result in the formation of a coarse precipitate, which acts as a cathode site in the sacrificial layer 3 and accelerates corrosion, thus lowering the pitting corrosion resistance of the sacrificial layer 3.

Hence, the Mn content is 2.0% by mass or less, preferably 0.3% to 1.2% by mass.

Dispersion of Intermetallic Compound Precipitated in Sacrificial Layer

The dispersion of an intermetallic compound precipitated in the sacrificial layer 3 after brazing heating at 595° C. for 3 minutes can be described as follows: the maximum size of Al—Mn, Al—Mn—Si, and Al—Cu intermetallic compounds precipitated in the sacrificial layer 3 in an electron micrograph of a cross section of the sacrificial layer 3 vertical to the rolling direction of the sacrificial layer 3 ranges from 10 nm to 1 μm in terms of equivalent circular diameter; the number density of Al—Mn, Al—Mn—Si, and Al—Cu intermetallic compounds having an equivalent circular diameter in the range of 10 nm to 1 μm is $1 \times 10^5/\text{mm}^2$ or more; and the area percentage of Al—Mn, Al—Mn—Si, and Al—Cu intermetallic compounds having an equivalent circular diameter in the range of 10 nm to 1 μm is 4% or less.

The phrase "the maximum size ranges from 10 nm to 1 μm in terms of equivalent circular diameter", as used herein, means that the maximum diameter of all intermetallic compounds in the electron microscopic field ranges from "10 nm to 1 μm".

As described above, Al—Mn, Al—Mn—Si, and Al—Cu intermetallic compounds are the origins of corrosion. In particular, a small number of such coarse intermetallic compound produce a small number of pitting corrosion sites originating from the particles, thus concentrating anodic dissolution on the pitting corrosion sites and accelerating pitting. Thus, the dispersion (the maximum size (in terms of equivalent circular diameter), the number density, and the area percentage) of an intermetallic compound precipitated in the sacrificial layer 3 must satisfy the conditions described above.

The number density is indicative of the number of origins of pitting corrosion. At a small number density, more specifically, at a number density below $1 \times 10^5/\text{mm}^2$, the number of origins of pitting corrosion decreases, and corrosion proceeds in the depth direction at a higher rate. The largest number density is generally, but not limited to, $1 \times 10^6/\text{mm}^2$ or less.

The dispersion of such an intermetallic compound can be controlled by adjusting the amounts of alloy components in the sacrificial layer 3 within the ranges described above and appropriately determining the conditions under which the homogenization heat treatment of the sacrificial layer 3 (an ingot for the sacrificial layer) described below is performed.

Figure 2A:
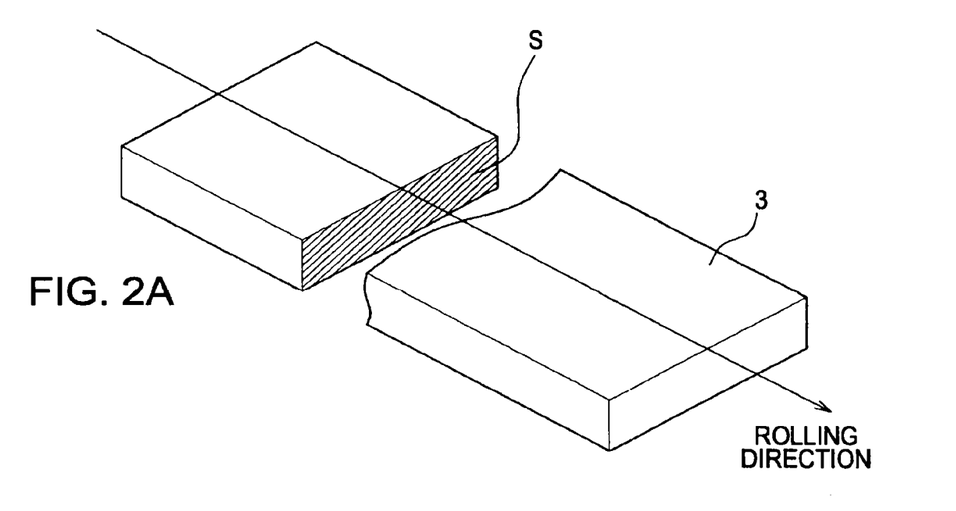
FIG. 2A is a schematic view of a cross section of a sacrificial layer.
Figure 2B:
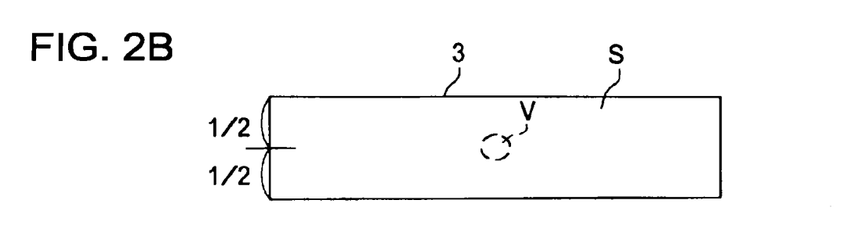
FIG. 2B is a schematic view of the point of observation with an electron microscope in the cross section of the sacrificial layer.
Figure 2C:
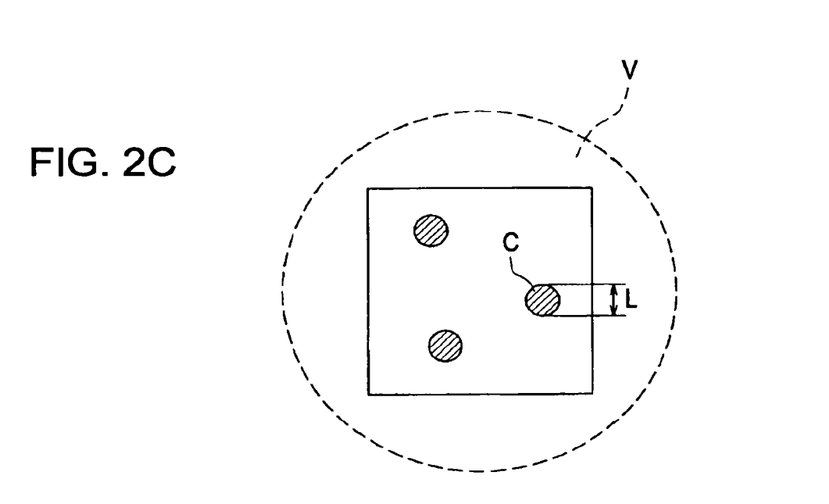
FIG. 2C is a schematic view illustrating the dispersion of an intermetallic compound in the electron microscopic field.

An example of a method for determining the dispersion of such an intermetallic compound will be described below with reference to FIGS. 2A to 2C.

First, a cross section S of the sacrificial layer 3 vertical to the rolling direction of the sacrificial layer 3 (see FIG. 2A) is observed with a scanning electron microscope at a magnification of 10,000 with the center of the field V being at half the thickness of the sacrificial layer 3 (see FIG. 2B), and a SEM image (electron micrograph) is taken. In a component system according to the present invention, all the precipitates contain any of Mn, Si, and Cu. The equivalent circular diameter L, the number, and the area percentage of particles of an intermetallic compound C containing Mn, Si, and Cu in the SEM field V (10 μm×10 μm) are measured to determine the dispersion of the intermetallic compound C (see FIG. 2C, which illustrates a SEM image of the field V in FIG. 2B).

Brazing Layer

The brazing layer 4 is formed of an Al—Si alloy. The Al—Si alloy may be a common JIS alloy, for example, 4343 or 4045. The Al—Si alloy includes an alloy containing Zn in addition to Si. In other words, the Al—Si alloy may be an Al—Si alloy or an Al—Si—Zn alloy. The Al—Si alloy may further contain Fe, Cu, Mn, and/or Mg, as well as Si and Zn.

Remainder: Al and Incidental Impurities

In addition to the components described above, the brazing layer 4 contains the remainder of Al and incidental impurities. Examples of the incidental impurities include Ti, Zr, B, and Fe. Such incidental impurities, for example, 0.05% by mass or less Ti, 0.2% by mass or less Zr, 0.1% by mass or less B, and 0.2% by mass or less Fe (each excluding 0% by mass) do not compromise the advantages of the present invention. Thus, the brazing layer 4 may contain such incidental impurities. More specifically, the brazing layer 4 may contain 0.4% by mass incidental impurities in total.

Intermediate Layer

Preferably, an intermediate layer 5 formed of a Mg-free aluminum alloy is disposed between the core layer 2 and the brazing layer 4. The intermediate layer 5 between the core layer 2 and the brazing layer 4 can prevent the thermal diffusion of Mg contained in the core layer 2 into the brazing layer 4 and thereby prevent deterioration in brazeability.

The intermediate layer 5 is formed of a Mg-free aluminum alloy, such as pure Al, a JIS 3003 alloy, or an aluminum alloy that contains Si, Mn, Cu, and/or Ti to improve the strength of the intermediate layer 5 and ensure the potential difference between the intermediate layer 5 and the brazing layer 4. Examples of the composition of the Mg-free aluminum alloy include Al-1Si-1Cu-1.6Mn. Such an intermediate layer 5 can prevent the thermal diffusion of Mg contained in the core layer 2. Furthermore, the addition of Si, Cu, Mn, and/or Ti allows the intermediate layer 5 to have a sufficiently higher electric potential than the brazing layer 4, thereby preventing corrosion of the core layer 2.

The clad sheet 1a or 1b can be manufactured by the following method.

First, an aluminum alloy for a core layer, an aluminum alloy for a sacrificial layer, and an aluminum alloy for a brazing layer are individually melted and cast into an ingot in continuous casting. If necessary, the ingot is subjected to facing (surface smoothing) and homogenization heat treatment. Through these processes, an ingot for a core layer, an ingot for a sacrificial layer, and an ingot for a brazing layer are manufactured.

An ingot for a sacrificial layer requires homogenization heat treatment to control the dispersion of an intermetallic compound precipitated. Preferably, the homogenization heat treatment is performed at a temperature in the range of 450° C. to 550° C. for 6 hours or less and at a cooling rate in the range of 0.5° C. to 2° C./min. An ingot for a core layer, an ingot for a sacrificial layer, and an ingot for a brazing layer are hot-rolled to form a sheet for a core layer, a sheet for a sacrificial layer, and a sheet for a brazing layer each having a predetermined thickness. A sheet for an intermediate layer can be manufactured in the same way as in the sheet for a sacrificial layer or the sheet for a brazing layer.

Subsequently, a sheet for a sacrificial layer is placed on one side of a sheet for a core layer, and a sheet for a brazing layer (and a sheet for an intermediate layer, if necessary) is placed on the other side of the sheet for a core layer. The stacked sheets are heat-treated (reheated) and bonded together by hot rolling to form a laminated sheet. The laminated sheet is then subjected to cold rolling, intermediate annealing (continuous annealing), and cold rolling. The laminated sheet may further be subjected to final annealing.

An additional process, such as a straightening process, may be performed before, during, or after the processes described above without producing adverse effects on the processes.

EXAMPLES

An aluminum alloy clad sheet for heat exchangers according to the present invention will be further described by comparing Examples that comply with the requirements set forth herein with Comparative Examples that do not comply with the requirements.

Sample Fabrication

Aluminum alloys for a core layer a to p having chemical compositions shown in Table 1 were melted and cast into an ingot at a casing temperature of 700° C. to produce an ingot. After homogenization heat treatment under conditions of 530° C. for 75 minutes and cooling to 500° C. at 0.5° C./min, the ingot was hot-rolled to produce a sheet for a core layer.

Aluminum alloys for a sacrificial layer A to J having chemical compositions shown in Table 2 were melted and cast into an ingot at a casing temperature in the range of 700° C. to 760° C. After homogenization heat treatment at a temperature in the range of 450° C. to 550° C. for 6 hours or less and at a cooling rate of 0.5° C./min, the ingot was hot-rolled at 400° C. or more to produce a sheet for a sacrificial layer.

An Al—Si alloy containing 11% by mass Si for a brazing layer was cast under common conditions, was subjected to homogenization heat treatment, and was hot-rolled to produce a sheet for a brazing layer.

Any one of the sheets for a sacrificial layer A to J was placed on one side of any one of the sheets for a core layer a to p thus produced, and a sheet for a brazing layer was placed on the other side of the sheet for a core layer. The stacked sheets were hot-rolled at a temperature in the range of 400° C. to 550° C. and were then cold-rolled to produce clad sheets Nos. 1 to 26 shown in Table 3. The clad sheets had a thickness of 0.25 mm, and the sacrificial layers had a thickness of 0.03 mm.

Tables 1 and 2 show the components of the core layers and the sacrificial layers. In Tables 1 and 2, the symbol "-" represents "none", and underlined values are outside the scope of the present invention.

TABLE 1

| Alloy Type Symbol | Component of Core Layer | | | | | Note | |
|---|---|---|---|---|---|---|---|
| | Si | Mn | Cu | Mg | Ti | | |
| a | 0.70 | 1.50 | 0.80 | — | 0.08 | Example | |
| b | 0.70 | 1.40 | 0.80 | 0.25 | 0.15 | Example | |
| c | 1.40 | 1.10 | 0.50 | 0.25 | 0.08 | Example | |
| d | 0.30 | 1.30 | 0.80 | 0.25 | 0.08 | Example | |
| e | 0.80 | 0.50 | 0.80 | 0.25 | 0.30 | Example | |
| f | 0.75 | 1.80 | 0.70 | 0.25 | 0.08 | Example | |
| g | 0.85 | 1.60 | 0.20 | 0.25 | 0.08 | Example | |
| h | 0.80 | 1.80 | 0.95 | 0.25 | 0.08 | Example | |
| i | 0.65 | 1.10 | 0.70 | 0.15 | 0.02 | Example | |
| j | 0.90 | 1.45 | 0.70 | 0.65 | 0.08 | Example | |
| k | <u>1.90</u> | 1.10 | 0.70 | 0.25 | 0.08 | Comparative Example | High Si |
| l | 0.70 | <u>2.20</u> | 0.70 | 0.20 | 0.15 | Comparative Example | High Mn |
| m | 0.70 | 1.60 | <u>0.05</u> | 0.30 | 0.15 | Comparative Example | Low Cu |
| n | 0.70 | 1.60 | <u>1.20</u> | 0.30 | 0.08 | Comparative Example | High Cu |
| o | 0.70 | 1.60 | 0.70 | <u>1.00</u> | 0.08 | Comparative Example | High Mg |
| p | 0.70 | 1.40 | 0.80 | 0.25 | <u>0.35</u> | Comparative Example | High Ti |

* The remainder of the component of a core layer were Al and incidental impurities.

TABLE 2

| Alloy type Symbol | Component of Sacrificial Layer | | | | Note | |
|---|---|---|---|---|---|---|
| | Zn | Cr | Si | Mn | | |
| A | 7.5 | 0.10 | — | — | Example | |
| B | 4.5 | 0.08 | 0.70 | 0.90 | Example | |
| C | 7.5 | 0.30 | 0.70 | 0.90 | Example | |
| D | 4.5 | 0.30 | 0.15 | 0.90 | Example | |
| E | 4.5 | 0.30 | 0.70 | 0.85 | Example | |
| F | <u>2.2</u> | 0.20 | 0.85 | 1.10 | Comparative Example | Low Zn |
| G | 5.0 | 0.20 | <u>1.20</u> | 0.90 | Comparative Example | High Si |
| H | 5.0 | 0.20 | 0.05 | <u>2.20</u> | Comparative Example | High Mn |
| I | 4.5 | <u>0.60</u> | 0.50 | 0.50 | Comparative Example | High Cr |
| J | 4.5 | — | 0.50 | 0.50 | Comparative Example | Low Cr |

* The remainder of the component of a sacrificial layer were Al and incidental impurities.

The aluminum alloy clad sheets for heat exchangers (samples) thus produced were heated at 595° C. for 3 minutes, which corresponded to brazing heating, and were then characterized by various tests described below. The dispersion (the maximum size (in terms of equivalent circular diameter), the number density, and the area percentage) of an intermetallic compound precipitated in the sacrificial layer was examined. The brazeability was evaluated in samples not subjected to heating corresponding to brazing heating.

Pitting Corrosion Resistance

Pitting corrosion resistance was evaluated by measuring the maximum pitting corrosion depth. The maximum pitting corrosion depth was measured as follows: a clad sheet was cut into a 50 mm×50 mm piece, which was immersed for one month in a simulated cooling water solution, OY water (Cl$^-$: 195 mass ppm, SO$_4^{2-}$: 60 mass ppm, Cu$^{2+}$: 1 mass ppm, Fe$^{3+}$: 30 mass ppm, pH: 3.0), in repeated cycles of 88° C. for 8 hours (including a heating time from room temperature to 88° C.) and room temperature for 16 hours (including a natural cooling time from 88° C. to room temperature). After this immersion test, the corrosion depth (maximum corrosion depth) in the sacrificial layer side was measured.

After a corrosion product formed on the surface of a clad sheet during the immersion test was removed, the pitting corrosion depth in the clad sheet was measured at 50 positions by the depth of focus method. The largest pitting corrosion depth was determined as the maximum pitting corrosion depth. Table 3 shows the maximum pitting corrosion depth (μm). The pitting corrosion resistance was rated as GOOD for a maximum pitting corrosion depth of 30 μm or less and POOR for a maximum pitting corrosion depth above 30 μm.

Brazeability

Brazeability was evaluated on the basis of a fluid coefficient in a drop test (a "drop-type fluidity test" method, described in Aluminum Brazing Handbook, published in January 1992, the Japan Light Metal Welding and Construction Association, p. 126). The brazeability was rated as GOOD for a fluidity of 65% or more and POOR for a fluidity below 65%. Melting of a core layer in brazing was also rated as POOR.

Dispersion of Intermetallic Compound Precipitated in Sacrificial Layer

In an aluminum alloy clad sheet after heating corresponding to brazing heating at 595° C. for 3 minutes, the maximum size of Al—Mn, Al—Mn—Si, and Al—Cu intermetallic compounds ("Precipitate in Sacrificial Layer" in Table 3) in a cross section of a sacrificial layer vertical to the rolling direction of the sacrificial layer, the number density (/mm$^2$) of Al—Mn, Al—Mn—Si, and Al—Cu intermetallic compounds having an equivalent circular diameter in the range of 10 nm to 1 μm, and the area percentage of Al—Mn, Al—Mn—Si, and Al—Cu intermetallic compounds having an equivalent circular diameter in the range of 10 nm to 1 μm were measured with a scanning electron microscope (SEM) in the following way.

(1) Test specimens for cross-sectional observation were prepared from five randomly-selected portions of a clad sheet. A surface (surface to be observed) of a test specimen for cross-sectional observation was mirror-finished by buffing.

(2) A single cross-sectional SEM image of a sacrificial layer of each test specimen was taken with a scanning electron microscope (JSM-T330 manufactured by JEOL Ltd.) at a magnification of 10,000 with the center of the field being at half the thickness of the sacrificial layer.

(3) The maximum size, the number, and the area percentage of intermetallic compound containing Mn, Si, and Cu in a microscopic field (10 μm×10 μm) were measured on the SEM image.

The maximum size of Al—Mn, Al—Mn—Si, and Al—Cu intermetallic compounds was rated as EXCELLENT for 50 nm to 500 nm, GOOD for 10 nm to 1 μm, and POOR for more than 1 μm, in terms of equivalent circular diameter.

The number density of Al—Mn, Al—Mn—Si, and Al—Cu intermetallic compounds was rated as excellent, good, and poor when the number of particles having an equivalent circular diameter in the range of 10 nm to 1 μm was in the range of 5×10$^5$ to 1×10$^6$/mm$^2$, 1×10$^5$/mm$^2$ or more, and less than 1×10$^5$/mm$^2$, respectively.

The area percentage of Al—Mn, Al—Mn—Si, and Al—Cu intermetallic compounds having an equivalent circular diameter of 10 nm to 1 μm was rated as good for 4% or less and poor for more than 4%.

Table 3 shows the test results. In Table 3, the symbol "-" means that the sample was not or could not be tested, and underlined values are outside the scope of the present invention or the evaluation criteria.

TABLE 3

| No. | Component of Core Layer Symbol | Component of Sacrificial Layer Symbol | Precipitate in Sacrificial Layer Max. Size | Precipitate in Sacrificial Layer Number Density (/mm$^2$) | Precipitate in Sacrificial Layer Area Percentage | Pitting Corrosion Resistance Maximum Pitting Corrosion Depth (μm) | Brazeability | Note | |
|---|---|---|---|---|---|---|---|---|---|
| 1 | a | A | Good | 1 × 10$^5$ | Good | 29 | Good | Example | |
| 2 | a | B | Good | 1 × 10$^5$ | Good | 27 | Good | Example | |
| 3 | b | A | Good | 1 × 10$^5$ | Good | 30 | Good | Example | |
| 4 | b | B | Good | 1 × 10$^5$ | Good | 28 | Good | Example | |
| 5 | b | C | Excellent | 3 × 10$^5$ | Good | 21 | Good | Example | |
| 6 | b | D | Excellent | 3 × 10$^5$ | Good | 27 | Good | Example | |
| 7 | b | E | Excellent | 6 × 10$^5$ | Good | 21 | Good | Example | |
| 8 | c | E | Excellent | 6 × 10$^5$ | Good | 29 | Good | Example | |
| 9 | d | E | Excellent | 6 × 10$^5$ | Good | 26 | Good | Example | |
| 10 | e | E | Excellent | 6 × 10$^5$ | Good | 22 | Good | Example | |
| 11 | f | E | Excellent | 6 × 10$^5$ | Good | 24 | Good | Example | |
| 12 | g | E | Excellent | 6 × 10$^5$ | Good | 27 | Good | Example | |
| 13 | h | E | Excellent | 6 × 10$^5$ | Good | 26 | Good | Example | |
| 14 | i | E | Excellent | 6 × 10$^5$ | Good | 29 | Good | Example | |
| 15 | j | E | Excellent | 6 × 10$^5$ | Good | 29 | Good | Example | |
| 16 | h | F | Good | 6 × 10$^5$ | Good | 81 | Good | Comparative Example | Low Zn in Sacrificial Layer |
| 17 | h | G | Poor | 4 × 10$^5$ | Good | 56 | Good | Comparative Example | High Si in Sacrificial Layer |
| 18 | h | H | Poor | 4 × 10$^4$ | Poor | 67 | Good | Comparative Example | High Mn in Sacrificial Layer |
| 19 | h | I | Poor | 6 × 10$^5$ | Poor | 55 | Good | Comparative Example | High Cr in Sacrificial Layer |
| 20 | h | J | Good | 8 × 10$^4$ | Good | 69 | Good | Comparative Example | Low Cr in Sacrificial Layer |
| 21 | k | B | — | — | — | — | Poor | Comparative Example | High Si in Core Layer |

TABLE 3-continued

| No. | Component of Core Layer Symbol | Component of Sacrificial Layer Symbol | Precipitate in Sacrificial Layer Max. Size | Precipitate in Sacrificial Layer Number Density (/mm$^2$) | Precipitate in Sacrificial Layer Area Percentage | Pitting Corrosion Resistance Maximum Pitting Corrosion Depth (μm) | Brazeability | Note | |
|---|---|---|---|---|---|---|---|---|---|
| 22 | l | B | Good | 1 × 10$^5$ | Good | 61 | Good | Comparative Example | High Mn in Core Layer |
| 23 | m | B | Good | 1 × 10$^5$ | Good | 70 | Good | Comparative Example | Low Cu in Core Layer |
| 24 | n | B | — | — | — | — | Poor | Comparative Example | High Cu in Core Layer |
| 25 | o | B | — | — | — | — | Poor | Comparative Example | High Mg in Core Layer |
| 26 | p | B | — | — | — | — | — | Comparative Example | High Ti in Core Layer |

Table 3 shows that the samples Nos. 1 to 15, which met the requirements of the present invention, exhibited satisfactory pitting corrosion resistance and brazeability.

In contrast, the sample No. 16, in which the Zn content in the sacrificial layer was below the lower limit, could not have a sufficient potential difference between the sacrificial layer and the core layer, and had intergranular corrosion in the core layer and low pitting corrosion resistance. The sample No. 17, in which the Si content in the sacrificial layer was above the upper limit, had a coarse precipitate, increased susceptibility to intergranular corrosion, and low pitting corrosion resistance. Because of the coarse precipitate, the dispersion of an intermetallic compound was outside the scope of the present invention.

The sample No. 18, in which the Mn content in the sacrificial layer was above the upper limit, had a coarse precipitate. Since the coarse precipitate acted as a cathode site in the sacrificial layer and accelerated corrosion, the sample No. 18 had low pitting corrosion resistance. Because of the coarse precipitate, the dispersion of an intermetallic compound was outside the scope of the present invention.

The sample No. 19, in which the Cr content in the sacrificial layer was above the upper limit, had a coarse precipitate, insufficient dispersion of cathode sites, and low pitting corrosion resistance. Because of the coarse precipitate, the dispersion of an intermetallic compound was outside the scope of the present invention. The sample No. 20, in which the Cr content in the sacrificial layer was below the lower limit, had insufficient dispersion of cathode sites and low pitting corrosion resistance. Because of the lack of fine dispersion effects, the dispersion of an intermetallic compound was outside the scope of the present invention.

In the sample No. 21, in which the Si content in the core layer was above the upper limit, the core layer had a lower melting point and could be melted during brazing. Since there was a possibility that the sample No. 21 could not be used as a clad sheet, the sample No. 21 was not evaluated for pitting corrosion resistance and the dispersion of intermetallic compound. The sample No. 22, in which the Mn content in the core layer was above the upper limit, had a coarse precipitate and poor processability. In addition, since pitting corrosion reaching the core layer acted as a cathode site, the sample No. 22 had low pitting corrosion resistance. The sample No. 23, in which the Cu content in the core layer was below the lower limit, had an insufficient potential difference between the core layer and the sacrificial layer and low pitting corrosion resistance.

In the sample No. 24, in which the Cu content in the core layer was above the upper limit, the core layer had a lower melting point and could be melted during brazing. Since there was a possibility that the sample No. 24 could not be used as a clad sheet, the sample No. 24 was not evaluated for pitting corrosion resistance and the dispersion of intermetallic compound. In the sample No. 25, in which the Mg content in the core layer was above the upper limit, Mg reacted with a flux component, and therefore the sample No. 25 had poor brazeability. Since there was a possibility that the sample No. 25 could not be used as a clad sheet, the sample No. 25 was not evaluated for pitting corrosion resistance and the dispersion of intermetallic compound. The sample No. 26, in which the Ti content in the core layer was above the upper limit, had a crack during rolling, and a test specimen could not be prepared.

When the Zn content in the sacrificial layer was above the upper limit of 10.0% by mass, a sample was difficult to prepare, and therefore there was no data on specific composition. In general, a Zn content in the sacrificial layer above the upper limit results in a fracture of the clad sheet during cladding and an increase in the self-corrosion rate of the sacrificial layer, which results in early corrosion and low pitting corrosion resistance of the sacrificial layer.

While preferred embodiments and examples of the present invention have been described above, the present invention is not limited to these embodiments and examples. Other variations and modifications may be made in accordance with the spirit and scope of the present invention. These variations and modifications are also within the scope of the present invention.

What is claimed is:

1. An aluminum alloy clad sheet, comprising:
   (i) a core layer;
   (ii) a sacrificial layer disposed on one side of the core layer; and
   (iii) a brazing layer comprising an Al-Si alloy disposed on the other side of the core layer,
   wherein the core layer (i) comprises Al and, by mass,
   Si: 0.15% to 1.6%,
   Mn: 0.3% to 2.0%,
   Cu: 0.1% to 1.0%, and
   Ti: 0.02% to 0.30%, and
   wherein the sacrificial layer (ii) comprises Al and, by mass,
   Zn: 4.0% to 10.0%, and
   Cr: 0.01% to 0.5%;

wherein the clad sheet shows a maximum pitting corrosion depth of 30 μm or less in the sacrificial layer when the clad sheet is immersed for one month in a simulated cooling water solution containing Cl$^-$: 195 mass ppm, $SO_4^{2-}$: 60 mass ppm, $Cu^{2+}$: 1 mass ppm, $Fe^{3+}$: 30 mass ppm, pH: 3.0, in repeated cycles of 88° C. for 8 hours and room temperature for 16 hours.

2. The sheet of claim 1, wherein the core layer (i) further comprises
Mg: 0.05% to 0.7% by mass.

3. The sheet of claim 2, further comprising:
(iv) an intermediate layer comprising a Mg-free aluminum alloy between the core layer (i) and the brazing layer (iii).

4. The sheet of claim 1, wherein the core layer (i) comprises 0.5 to 1.2% Si, by mass.

5. The sheet of claim 2, wherein the core layer (i) comprises 0.5 to 1.2% Si, by mass.

6. The sheet of claim 3, wherein the core layer (i) comprises 0.5 to 1.2% Si, by mass.

7. The sheet of claim 1, wherein the core layer (i) comprises 0.6% to 1.7% Mn, by mass.

8. The sheet of claim 2, wherein the core layer (i) comprises 0.6% to 1.7% Mn, by mass.

9. The sheet of claim 3, wherein the core layer (i) comprises 0.6% to 1.7% Mn, by mass.

10. The sheet of claim 1, wherein the core layer (i) comprises 0.6% to 1.0% Cu, by mass.

11. The sheet of claim 2, wherein the core layer (i) comprises 0.6% to 1.0% Cu, by mass.

12. The sheet of claim 3, wherein the core layer (i) comprises 0.6% to 1.0% Cu, by mass.

13. The sheet of claim 1, wherein the core layer (i) comprises 0.1% to 0.5% Mg, by mass.

14. The sheet of claim 2, wherein the core layer (i) comprises 0.1% to 0.5% Mg, by mass.

15. The sheet of claim 3, wherein the core layer (i) comprises 0.1% to 0.5% Mg, by mass.

16. The sheet of claim 1, wherein the core layer (i) comprises 0.2% by mass or less Zr, excluding 0% by mass.

17. The sheet of claim 1, wherein the core layer (i) comprises 0.1% by mass or less B, excluding 0% by mass.

18. The sheet of claim 1, wherein the core layer (i) comprises 0.2% by mass or less Fe, excluding 0% by mass.

19. The sheet of claim 1, wherein the sacrificial layer (ii) comprises 4.5% to 7.0% Zn, by mass.

20. The sheet of claim 19, wherein the sacrificial layer (ii) comprises 7.0% to 10.0% Zn, by mass.

* * * * *